United States Patent
Benfold et al.

(10) Patent No.: US 12,246,254 B2
(45) Date of Patent: Mar. 11, 2025

(54) MAINTAINING OBJECT ALIGNMENT IN 3D MAP SEGMENTS

(71) Applicant: Niantic, Inc., San Francisco, CA (US)

(72) Inventors: Ben Benfold, Oxford (GB); Victor Adrian Prisacariu, Oxford (GB); Daniel Knoblauch, San Francisco, CA (US)

(73) Assignee: Niantic, Inc., San Francisco, CA (US)

( * ) Notice: Subject to any disclaimer, the term of this patent is extended or adjusted under 35 U.S.C. 154(b) by 283 days.

(21) Appl. No.: 17/877,562

(22) Filed: Jul. 29, 2022

(65) Prior Publication Data
US 2024/0033631 A1 Feb. 1, 2024

(51) Int. Cl.
*A63F 13/5378* (2014.01)

(52) U.S. Cl.
CPC .................. *A63F 13/5378* (2014.09)

(58) Field of Classification Search
CPC ................ A63F 13/5378; A63F 13/216
See application file for complete search history.

(56) References Cited

U.S. PATENT DOCUMENTS

| | | | |
|---|---|---|---|
| 2013/0271488 A1 | 10/2013 | Stirbu et al. | |
| 2019/0178673 A1 | 6/2019 | Strawn et al. | |
| 2019/0371067 A1* | 12/2019 | Simari | G06T 19/20 |
| 2020/0051327 A1 | 2/2020 | Dolan et al. | |
| 2020/0158529 A1 | 5/2020 | Zhang et al. | |
| 2020/0242818 A1 | 7/2020 | Liu et al. | |
| 2021/0102820 A1* | 4/2021 | Le | G06F 1/1694 |
| 2023/0247096 A1* | 8/2023 | Segal | G06T 19/006 463/42 |

OTHER PUBLICATIONS

PCT International Search Report and Written Opinion, PCT Application No. PCT/IB2023/057721, Oct. 26, 2023, 8 pages.

* cited by examiner

*Primary Examiner* — James S. McClellan
(74) *Attorney, Agent, or Firm* — Fenwick & West LLP (57) ABSTRACT

A method of determining a position for a virtual object is described. A location of a client device is determined, and, based on the determined location a set of map segments is retrieved. A virtual object is determined to be displayed on the client device. Relation vectors between the virtual object and each map segment of the retrieved set of map segments are obtained. Each relation vector is weighted based on object parameters of the virtual object. A position to display the virtual object is determined based on the weighted relation vectors. The virtual object is provided for display on the client device as the determined position.

20 Claims, 6 Drawing Sheets

MAINTAINING OBJECT ALIGNMENT IN 3D MAP SEGMENTS

TECHNICAL FIELD

The present disclosure relates generally to augmented reality (AR), and in particular to maintaining spatial relationships between different sets of three-dimensional (3D) map data in an AR application.

BACKGROUND

Parallel reality applications have a virtual geography that mirrors at least a portion of real-world geography. In order to create and maintain a virtual geography that resembles real world geography, new images of the real world are frequently taken in by an AR system to update the virtual geography. To process multiple images into a three dimensional representation of the world, some AR systems use visual anchors, such as a small piece of one image, and orient other images into a three dimensional space based on their relative coordinates to the visual anchor. This method, however, may result in virtual objects being difficult to place in a representation of the real world. Particularly for larger AR environments.

SUMMARY

A method is described for positioning virtual objects to maintain their alignment in map segments of a three dimensional (3D) representation of a portion of the real world. The method creates a map of a large area of the real world that is made of map segments. Each map segment may be a point cloud of image data captured by a mobile device or other 3D representation of a physical environment. Drift of the map segments and other errors are corrected for by recording the position of virtual objects relative to multiple map segments and determining where to display the virtual object using a combination (possibly weighted) of the virtual object's position in at least some of the map segments.

In some embodiments, the method includes determining the location of a client device in the real world and retrieving a set of map segments based on the client device's location. For each of the retrieved map segments, a relation vector is obtained. The relation vectors are weighted based on object parameters associated with a virtual object. Based on the weighted relation vector a position to display the virtual object is determined. The virtual object is provided for display in the determined position.

These and other features, aspects and advantages may be better understood with reference to the following description and appended claims. The following description describes various embodiments where the AR application is a parallel reality game, but it should be understood that the same or similar techniques are applicable to many AR applications. The accompanying drawings illustrate specific embodiments and, together with the description, serve to explain various principles. However, the drawings should not be considered limiting. Rather, the scope of protection should be determined from the claims.

DETAILED DESCRIPTION

Reference now will be made in detail to various embodiments, one or more examples of which are illustrated in the drawings. Each example is provided by way of explanation of the described embodiments, not limitation of the claims. In fact, it will be apparent to those skilled in the art that various modifications and variations can be made without departing from the principles described. For instance, features illustrated or described as part of one embodiment can be used with another embodiment to yield a still further embodiment. Thus, it is intended that the present disclosure covers such modifications and variations as come within the scope of the appended claims and their equivalents.

Overview

Generally, the present disclosure relates to parallel reality games that occur in virtual worlds that are mapped to real world locations. The virtual world has experiences that relate to real world actions, such experiences incorporating virtual elements, such as virtual objects, virtual items, virtual energy, virtual characters, and other virtual elements, that can be used or collected by players of a parallel reality game having a virtual world that parallels at least a portion of the real world. In particular, the experiences in the virtual world are determined based on data associated with one or more real world actions. In this way, virtual experiences can correspond to actions in the real world that make game play more immersive. Moreover, locating virtual experiences in the virtual world based on data associated with real world actions and conditions improves the link between the parallel virtual world and the real world, further enhancing the illusion that the virtual world is another dimension of the real world that the player can perceive and interact with through the parallel reality game.

A game server can host a location-based parallel reality game having a player gaming area that includes a virtual environment with a geography that parallels at least a portion of the real-world geography. Players can navigate a virtual space in the virtual world by navigating a corresponding geographic space in the real world. In particular, players can navigate a range of coordinates defining a virtual space in the virtual world by navigating a range of geographic coordinates in the real world.

In one aspect, the positions of players can be monitored or tracked using, for instance, a positioning system (e.g. a GPS system) associated with a player's mobile computing device (e.g. cell phone, smartphone, gaming device, AR headset, or other device). The position and orientation of the player's mobile computing device (collectively, the device's "pose") may be determined from sensor data (e.g., images captured by a camera of the device) using a localization process that is more precise than the positioning system. As players move about in the real world, player position information can be provided to the game server hosting the parallel reality game over a network. The game server can update player positions in the parallel virtual world to correspond with the player positions in the real world.

The parallel reality game can include one or more virtual elements that players can interact with during the course of the parallel reality game. To interact with virtual elements, a player may have to travel to the corresponding location of the virtual element in the real world and perform any necessary interactions in the parallel reality game. According to aspects of the present disclosure, virtual experiences can be generated in the virtual world based on data associated with real world actions. The data associated with real world actions can be analyzed to determine experiences in the virtual worlds. For instance, actions in the real world can result in experiences in the virtual world that result from the real world actions.

Tying virtual experiences to real world actions permits a more engaging experience for players. In this manner, the subject matter of the present disclosure can have a technical effect of providing for an improved computer-based implementation of a parallel reality game that provides for the generation of virtual experiences in a parallel reality game in a manner that improves the link between the real world and the parallel virtual world.

In one embodiment, a game server associated with a parallel reality game can access data associated with the location of individuals in the real world. The data associated with the location of individuals in the real world can be obtained or derived from any suitable source. The data associated with the location of individuals in the real world can include the locations of mobile device users in the real world. In particular, users of mobile devices, such as smart phones, can optionally provide position information, in terms of geographic location in the real world, in order to enhance certain location-based features or other functionality. Any information optionally provided by mobile device users can be provided on conditions of anonymity to protect the privacy of the user optionally providing the position information.

Data associated with the locations of individuals in the real world can also include data associated with the locations of players of the parallel reality game. In particular, the game server can receive position information from each of the plurality of players during play of the parallel reality game such that the game server can update the position of the player in the parallel virtual world associated with the parallel reality game.

The game server can analyze the data associated with the locations of individuals in the real world and generate a virtual experience based on such data. For instance, the game server can locate virtual elements in the virtual world for a user that are collected when that user (or another different user) travels to a particular location in the real world. In certain aspects, the virtual elements can be used to enhance an experience in the real world. For example, virtual elements can be exchanged or presented for one or more goods or services in the real world. Generation of virtual experiences in a virtual world based on real world actions can give players a reason to travel to a particular location in the real world.

In a particular implementation, certain real world actions can be directly and/or indirectly mapped to experiences in the virtual world. For instance, weather data from the real world can have a direct mapping to virtual weather in the virtual world. Similarly, weather data in the real world can be indirectly mapped to the virtual world, such as by causing certain virtual elements to be more challenging to locate when weather conditions in the real world indicate rain. As described herein, such mapping can include any real world action and can directly or indirectly map to one or more experiences in the virtual world, regardless of whether such experience is related to the real world action. As another example, a solar eclipse in the real world could indirectly map to the virtual world and result in a virtual experience in which virtual energy is increased for all players in the virtual world. Alternatively, or in combination with the aforementioned example, the solar eclipse could directly map to the virtual world and cause a virtual solar eclipse that is visible in the virtual world. In this way, the game server can generate virtual experiences in the virtual world from real world actions.

The game server can generate virtual experiences in the parallel virtual world based on other data associated with real world actions. For instance, the game server can create virtual experiences based on real world actions associated with items of cultural, recreational, or commercial value, map data, hazard data, weather data, event calendar data, and other suitable data. As an example, the game server can include virtual experiences in the virtual world based on actions associated with real world items corresponding to locations of public, educational, commercial, or recreational value, such as locations of public artwork, tourist attractions, scenic vistas, libraries, or hiking trails.

Exemplary Location-Based Parallel Reality Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure may be applied to other gaming systems. In addition, the inherent flexibility of computer-based systems allows for a great variety of possible configurations, combinations, and divisions of tasks and functionality between and among the components of the system. For instance, the systems and methods for modifying or verifying game data according to aspects of the present disclosure can be implemented using a single computing device or across multiple computing devices.

Figure 1:
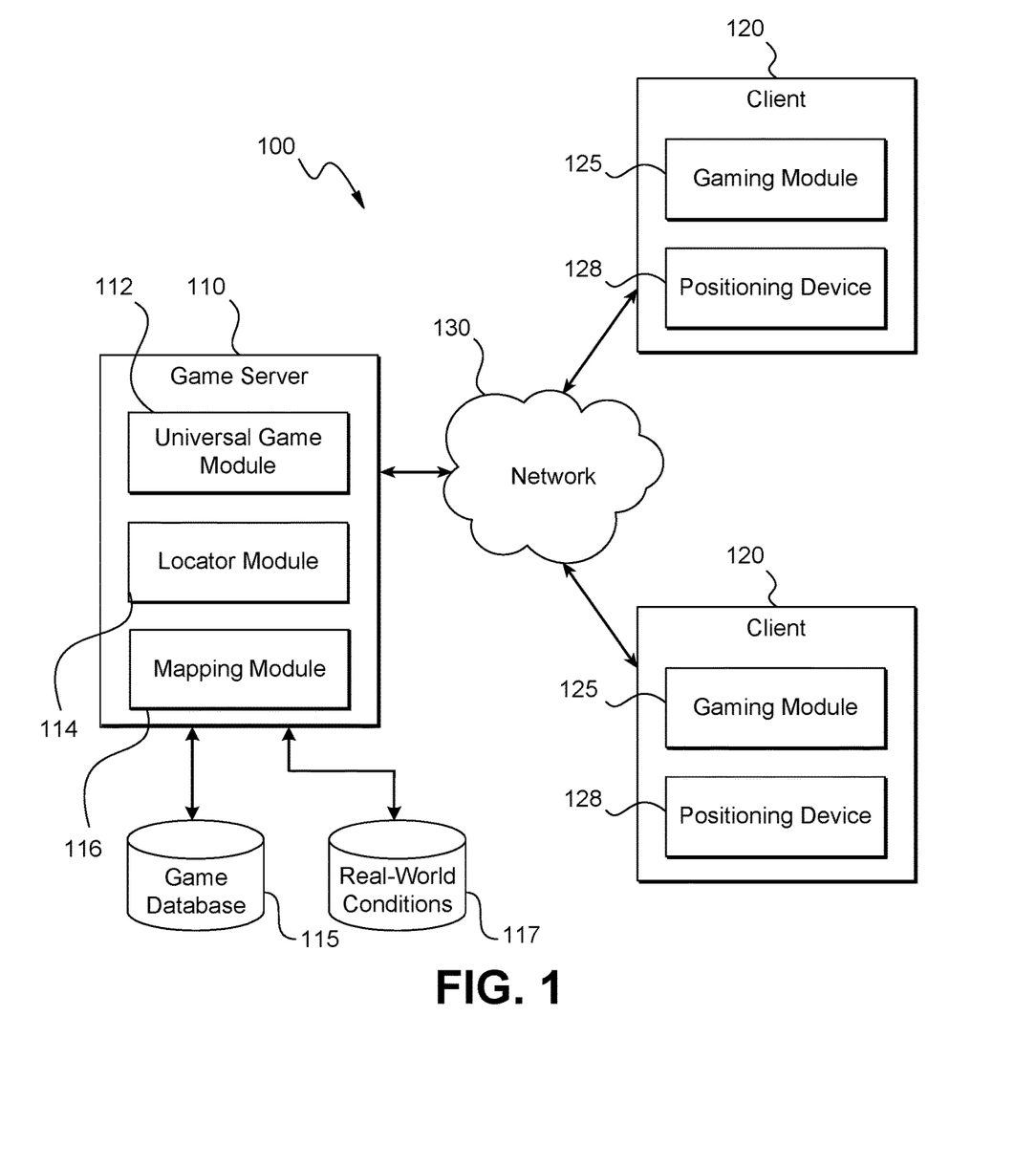
FIG. 1 depicts a computer-based system for implementing a parallel-reality game, according to one or more embodiments.

FIG. 1 illustrates an exemplary computer-implemented location-based gaming system 100 configured in accordance with an embodiment. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
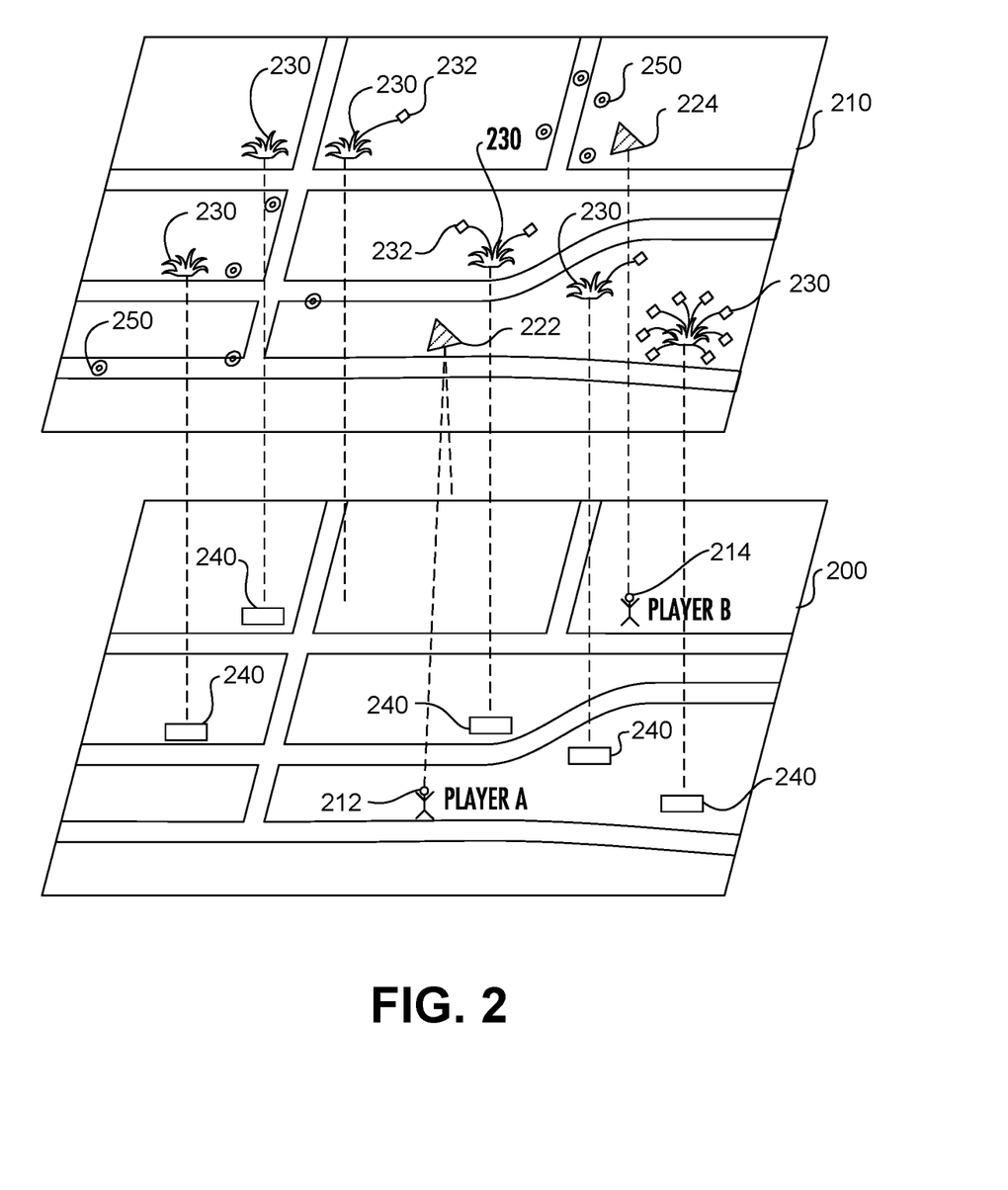
FIG. 2 depicts a representation of a virtual world having a geography that parallels the real world, according to one or more embodiments.

FIG. 2 depicts a conceptual diagram of a virtual world 210 that parallels the real world 200 that can act as the game board for players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a countly, continent, the entire globe, or other geographic area. Each geographic coordinate in the range of geographic coordinates in the real world 200 is mapped to a corresponding coordinate in a virtual space in the virtual world 210.

A player's position in the virtual world 210 corresponds to the player's position in the real world 200. For instance, player A, located at position 212 in the real world 200, has a corresponding position 222 in the virtual world 210. Similarly, player B, located at position 214 in the real world 200, has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world 200. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective can include players interacting with or otherwise claiming ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player may travel to the landmark or geographic location 240 linked to the virtual elements 230 in the real world and interact with the virtual elements 230 in the virtual world 210. For example, player A of FIG. 2 may travel to a landmark 240 in the real world 200 in order to interact with a virtual element 230 linked with that particular landmark 240. The interaction with the virtual element 230 can be tied to action in the real world, such as taking a photograph and/or verifying, obtaining, or capturing other information about the landmark or object 240 associated with the virtual element 230. In another example, a player may send a virtual character to a landmark 240 at a particular remote virtual location so that the virtual character can interact with a virtual element 230, object 240, or other player 214 there.

Game objectives can include that players use one or more virtual items that are collected by the players in the location-based game. For instance, the players may travel the virtual world seeking virtual items (e.g. weapons, food, medical supplies, soldiers, creatures, or other items) that can be useful for completing game objectives. These virtual items can be found or collected by traveling to different locations in the real world or by completing various actions in either the virtual world or the real world. For example, players may interact with virtual elements 230 in the virtual world to obtain virtual items. In the embodiment shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the player's team and/or faction.

In one particular implementation, a player may gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be temporarily disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. For convenience, all such groupings of players are referred to as teams herein. In this manner, the location-based game can intrinsically be a social game that encourages cooperation among players within the game. Players from opposing teams can work against each other during the location-based game. A player can use virtual items to attack or impede progress of players on opposing teams. In some instances, players from different teams may collaborate in certain shared virtual experiences (e.g., boss battles) to achieve a common objective.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the illustrated computer-implemented location-based gaming system 100 includes a client-server architecture, where a game server 110 communicates with one or more clients 120 over a network 130. Although two clients 120 are illustrated in FIG. 1, any number of clients 120 can be connected to the game server 110 over the network 130. The server 110 can host a universal gaming module 112 that controls aspects of the location-based game for players and receives and processes input from players in the location based game. On the client-side, each client 120 can include a gaming module 125 that operates as a gaming application so as to provide a user with an interface to the system 100. The game server 110 transmits game data over the network 130 to the client 120 for use by the gaming module 125 at the client 120 to provide local versions (e.g. portions of the virtual world specific to player locations) of the game to players at locations remote from the game server 110.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include a processor and a memory. The memory can store instructions which cause the processor to perform operations. The game server 110 can include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to represent the virtual world on a display device, geographic coordinates of locations in the virtual world, etc.); (2) data associated with players of the location-based game (e.g. player information, player experience level, player currency, player inventory, current player positions in the virtual world/real world, player energy level, player preferences, team information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements, corresponding actual world position information for virtual elements, behavior of virtual elements, relevance of virtual elements, etc.); (5) data associated with real world objects, landmarks, positions linked to virtual world elements (e.g. location of real world objects/landmarks, description of real world objects/landmarks, relevance of virtual elements linked to real world objects, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

As will be discussed in further detail below, the game server 110 can include or can also be in communication with a real-world condition database 117. The real-world condition database 117 can be a part of, integral with, or separate from the game database 115. The real-world condition database 117 stores data associated with real-world conditions, such as the individual and/or aggregate locations of players in the real world; actions associated with locations of cultural value or commercial value; map data providing the locations of roads, highways, and waterways; current and past locations of individual players; hazard data, weather data; event calendar data; and other suitable data. The data stored in the real-world condition database 117 can be collected or obtained from any suitable source. For example, in one aspect, the real-world condition database 117 can be coupled to, include, or be part of a map database storing map information, such as one or more map databases accessed by a mapping service. According to another exemplary aspect, the real-world condition database 117 can obtain or access data associated with past and current locations of players, for instance, from the game database 115. According to yet another exemplary aspect, the real-world condition database 117 can be coupled to one or more external data sources or services that periodically provide population data, hazard data, weather data, event calendar data, or other data to the real-world condition database 117.

The game server 110 can be configured to receive requests for game data from one or more clients 120 (for instance, via remote procedure calls (RPCs)) and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client device 120 can be configured to periodically send player input, player location, and other updates to the game server 110, which the game server 110 uses to update game data in the game database 115 to reflect changed conditions for the game.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, player status, landmark information, etc.) and incorporates the game data received into the overall location-based game for all players of the location-based game. The universal game module 112 can also manage the delivery of game data to the clients 120 over the network 130.

In the embodiment shown in FIG. 1, the game server 110 also includes a locator module 114. The locator module 114 can be a part of or separate from the universal game module 112. The locator module 114 is configured to access data associated with real world actions, analyze the data, and determine virtual experiences in the virtual world based on the data associated with real world actions. For instance, the locator module 114 can modify game data stored in the game database 115 to locate virtual experiences in the virtual world based on the data associated with real world actions.

The mapping module 116 creates and updates a map of real world geography. For example, the mapping module 116 receives images of the real world from one or more client devices 120 and combines those images into a three dimensional representation of the real world. The game server 110 may use this three dimensional representation to update the geography of the virtual world to more closely mirror the real world. In addition to images of the real world, the mapping module 116 additionally receives location data from the positioning device 128 of the client device 120 to assist the mapping module 116 in placing the image data into the correct place in the three dimensional representation.

The mapping module 116 creates the three dimensional representation of the real world by creating map segments, each describing a portion of the real world and being tagged with a real world location (e.g., GPS coordinates). In one embodiment, each map segment is a point cloud or mesh with a three dimensional geometry. The map segments are generated, for example, by a user of a client device 120 capturing a video of a local area around the client device. The image data (e.g., the video) is communicated to the mapping module 116 of the game server 110 that generates a map segment from the image data. The mapping module 116 may determine relative positions (e.g., translation vectors between map segment coordinate spaces) between each map segment and nearby (e.g., adjacent map segments) to create the three dimensional representation of the real world made up of interrelated map segments.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 is any computing device that can be used by a player to interact with the gaming system 100. For instance, a client 120 can be a wireless device, a personal digital assistant (PDA), portable gaming device, cellular phone, smartphone, tablet, navigation system, handheld GPS system, or other such device. In short, a client 120 can be any computer-device or system that can execute a gaming module 125 to allow a player to interact with the virtual world.

The gaming module 125 executed by the client 120 provides an interface between a player and the location-based game. The gaming module 125 can present a user interface on a display device associated with the client 120 that displays a virtual world associated with the game and allows a user to interact in the virtual world to perform various game objectives. The gaming module 125 can also control various other outputs to allow a player to interact with the game without requiring the player to view a display screen. For instance, the gaming module 125 can control various audio, vibratory, or other notifications that allow the player to play the game without looking at the display screen. The gaming module 125 can access game data received from the game server 110 to provide an accurate representation of the game to the user. The gaming module 125 can receive and process player input and provide updates to the game server 110 over the network 130.

Because the gaming system 100 is for a location-based game, the client 120 is preferably a portable computing device, such as a smartphone or other portable device, that can be easily carried or otherwise transported with a player. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As the player moves around with the client 120 in the real world, the positioning device 128 tracks the position of the player and provides the player position information to the gaming module 125. The gaming module 125 updates the player position in the virtual world based on the actual position of the player in the real world. In particular, the location of the player in the virtual world can correspond to the location of the player in the real world. The gaming module 125 can provide player position information to the game server 110 over the network 130 such that the universal gaming module 112 keeps track of player positions throughout the game.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, S1v1TP, FTP), encodings or formats (e.g. HTML, JSON, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Mapping Module

Figure 3:
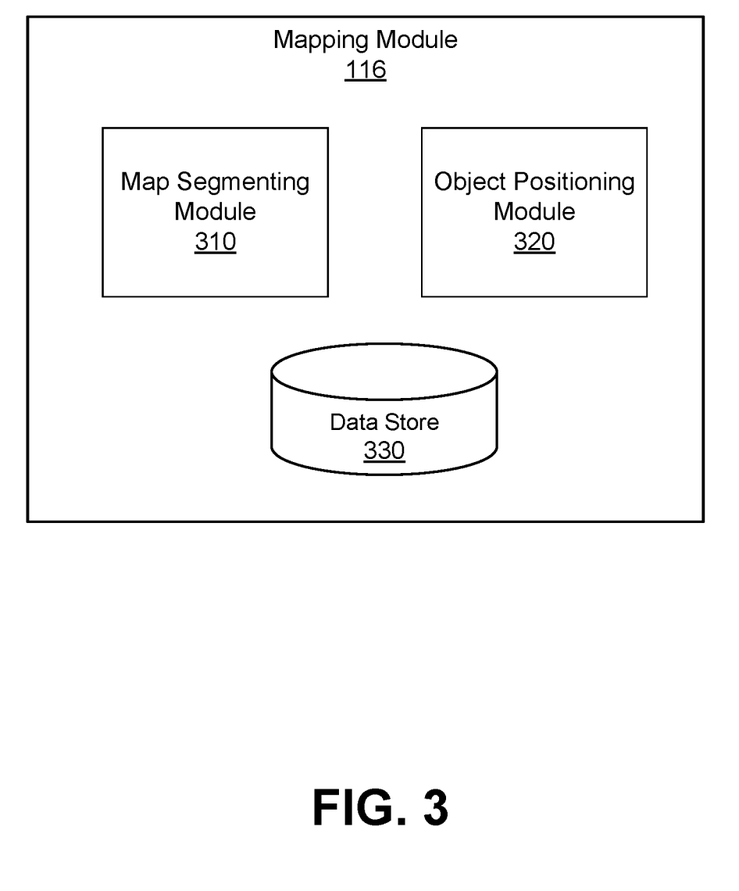
FIG. 3 is a block diagram of a mapping module according to one or more embodiments.

FIG. 3 is a block diagram of a mapping module 116 according to one or more embodiments. The mapping module 116 includes a map segmenting module 310, an object positioning module 320, and a datastore 330. These modules 310-330 enable the mapping module 116 to take in image data from a client device 120 and create or update a three dimensional representation of the real world.

The map segmenting module 310 receives image data or map data of a three dimensional representation of the real world and generates discrete map segments. A map segment may consist of one instance of image data being received. For example, a user of a client device may capture image data (e.g., a picture or video) of the area surrounding the client device, and that video is communicated to the map segmenting module 310 that converts the image data into a map segment. A single map segment may include image data received from a single client device in a preset time period (e.g., 30 seconds of video received from a client device). In some embodiments, a map segment may combine image data from multiple client devices captured at the same location and time (e.g., within a preset time period and within a threshold distance). In another embodiment, the map segmenting module 310 sets a fixed size for each map segment and takes in image data until the data satisfies the fixed size. For example, a map segment may represent a cubic volume of the real world wherein each edge of the cube is a fixed length (e.g., 3 meters). The map segmenting module 310 may determine based on the location data received from the client device if the image data belongs in a specific cubic map segment and add the received image data to that segment until all of the data needed to complete that map segment is received. Map segments are arranged to produce a three dimensional representation of a local area. Each map segment can be rotated or translated independently of other map segments to create s representation of the real world that aligns with current sensor data being captured by a client device 120.

Once the map segmenting module 310 has created a map segment, the map segment is stored in the data store 330. The map segmenting module 310 may determine a placement for the map segment relative to other map segments and that data store 330 additionally stores that relationship. As more image data is received and more map segments are created, previous map segments may be shifted and/or rotated to improve the accuracy of the three dimensional representation of the real world. As map segments are shifted the data store 330 is updated to contain updated relationships between map segments.

The map segmenting module 310 additionally receives location data of a client device associated with the game sever 110 to assist the mapping module 116 in positioning a virtual object. The map segmenting module 310 uses the location data (e.g., GPS coordinates in the real world) to retrieve a set of map segments in the data store 330 that correspond to the location of the client device. For example, if the location data of the client device indicates that the client device is near a landmark, the map segmenting module 310 will retrieve all map segments associated with the landmark from the data store 330. In some embodiments, the map segmenting module 310 retrieves a set number of map segments or a set of map segments that are associated with locations within a threshold distance of the received location data. For example, the map segmenting module 310 may retrieve the map segment including the location of the client device as well as the 8 closest map segments. In another example, the map segmenting module 310 retrieves a set of map segments that include locations within a 100 foot radius of the location data. This set of map segments is used to position a virtual object for display on a client device.

The object positioning module 320 places virtual objects within map segments and updates the positions of the virtual objects as additional image data is received by the map segmenting module 310. Virtual objects may be created by an administrator of the game server 110 with a set of object parameters. The object parameters specify rules for placing the virtual object. For example, a virtual object that is a painting may include object parameters indicating that the painting be placed on a flat, vertical surface such as a wall. A virtual object that is a fence may include object parameters indicating that the fence is straight and continuous.

Figure 4A:
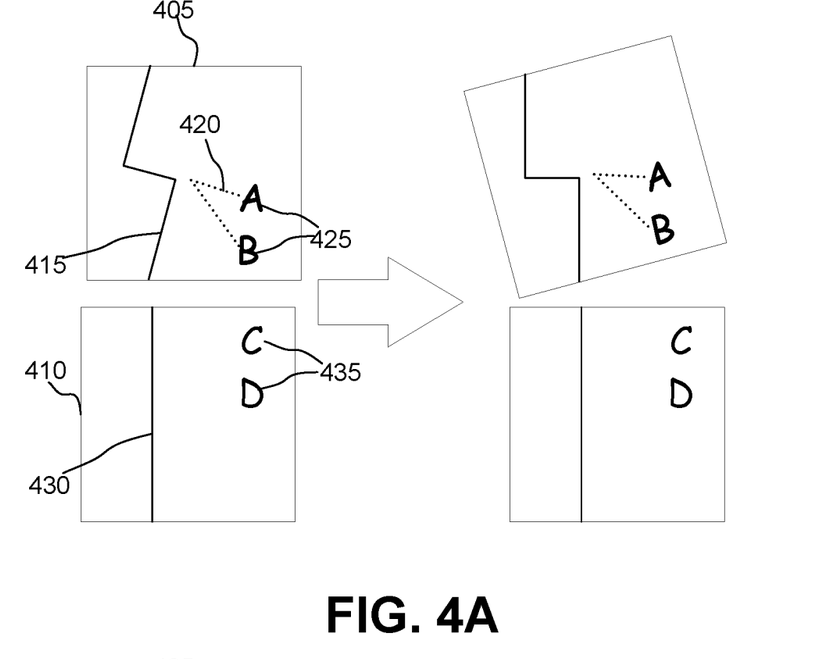
FIGS. 4A and 4B illustrate two examples of method of map segment alignment according to one or more embodiments.
Figure 4B:
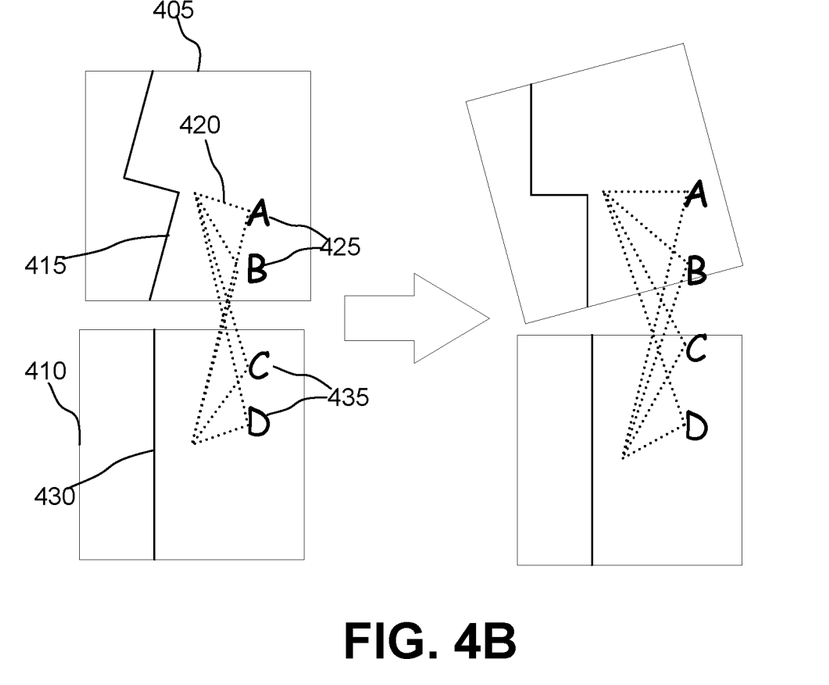

For each virtual object, the object positioning module 320 generates relation vectors between the virtual object and a set of map segments. The set of map segments may be the map segments that are closest to the virtual object. In some embodiments the set of map segments is chosen based on the object parameters. The relation vectors indicate a position of the virtual object relative to each map segment of the set of map segments. The relation vectors may be from any point in the map segment, such as the center or an edge, to the virtual object. Example relation vectors are shown in FIG. 4. In some embodiments, the object positioning module 320 may additionally detect real world surfaces or objects in the set of map segments and generate relation vectors between the virtual object and the real world surfaces or objects.

In some embodiments, the object positioning module 320 may have a preset thresholds for lower and upper bounds on the number of relation vectors determined. Having a high number of relation vectors may increase the accuracy of the map segment alignment but requires a high amount of computing power to solve. The number of relation vectors used is tuned for accuracy while retaining low computing power and therefore low lag.

The object positioning module 320 additionally determines relative weightings of relation vectors based on the object parameters of the virtual object. The weighting of a relation vector indicates how strictly the positional relationship between the virtual object and the real world object or map segment is retained as map segments shift and update. For example, if the virtual object is a flower and has relation vectors to the ground below it, the map segment it is in, and the map segments adjacent to the map segment it is in, the relation vector between the flower and the ground below may be weighted highly. The high weight ensures that as map segments shift or update the flower will remain on the ground. The weighting of the relation vectors to the adjacent map segments may be low as the object parameters of the virtual flower indicate that the position of the flower is not related to anything in the adjacent map segments. In an example in which the virtual flower is part of a line of other virtual flowers, such as running along a sidewalk in the real world, each virtual flower may have a highly weighted relation vector to other map segments that contain the line of virtual flowers. That high weighting to the other map segments allows for the line of flowers to be kept together such as to keep the virtual flowers evenly spaced or in a straight line. The line of flowers may also have a highly weighted relation vector to the real world sidewalk to keep the flowers along the sidewalk.

When a player of the game associated with the game server 110 triggers a virtual object to be placed, for example by being at a certain location or activating a game feature, the object positioning module 320 determines a position to display the virtual object on the screen of the client device associated with the player. The object positioning module 320 determines a placement of the virtual object that satisfies the weighted relation vectors such that highly weighted vectors are kept nearly the same. The object positioning module 320 may determine the position to display the virtual object on the client device such as by solving a system of equations including the weighted relation vectors. The object positioning module 320 may determine a position to place the virtual object at a specific coordinate of a map segment and then determine a corresponding placement of the virtual object on a client device screen.

The data store 330 stores data used by the modules 310 and 320. The data store 330 may contain previous object placements such that those placements can be re-used on virtual objects having similar object parameters. The data store 330 may also store a history of positioning of the map segments such that if a position of a map segment is changed based on new information being received by the mapping module 116, the position of the map segment can be reverted to its previous position if needed or the position of the map segment can be traced over time. The data store 330 additionally stores object parameters. In some embodiments the data store 330 additionally stores location data from the client device 120 that provided the image data for the map segment.

FIGS. 4A and 4B illustrate two examples of virtual object positioning using relation vectors according to one or more embodiments. In both FIGS. 4A and 4B map segment 405 and adjacent map segment 410 have virtual objects 425 and 435 respectively. The map segments 405 and 410 on the left side represent the three dimensional representation of the real world at a time before updated image data is received by the game server 110. On the right side, the map segments 405 and 410 have been shifted or have drifted due to new image data being added to the three dimensional representation of the real world. Before and after the shifting of the map segments the position of the virtual objects 425 and 435 may change. In the example shown in FIGS. 4A and 4B the new image data indicates that the surface 415 and surface 430 are a straight wall, and therefore the map segments are shifted to correct the angle of the wall such that surfaces 415 and 430 are linear.

FIG. 4A is an example of virtual object positioning using relation vectors 420 that only define a relationship between the virtual objects 425 and the segment 405 that the virtual objects are originally placed in. The relation vectors 420 indicate a position of the virtual objects 425 relative to the center of the segment 405. In the example of FIG. 4A, because there are no relation vectors from virtual objects 425 to map segment 410, when may segment 405 is shifted the virtual objects 425 are moved away from the virtual objects 435. The lack of relation vectors between each virtual object and each map segment prevents the virtual objects from staying aligned or evenly spaced when the map segment 405 is shifted. Instead, the virtual objects 425 shift with the map segment 405, and do not stay aligned with the objects 435.

In FIG. 4B the virtual objects 425 have relation vectors to both the map segment 405 that they are in and the adjacent map segment 410. Similarly, the virtual objects 435 have relation vectors to the map segment 410 they are in as well as the adjacent map segment 405. In order to preserve the alignment of the virtual objects 425 and 435 that have a strong positional relationship to each other, such as being different parts of a larger structure (e.g., posts making up a fence). So that the virtual objects 425 and 435 maintain their relative positions and alignments, the relation vectors may be weighted approximately evenly (e.g., within 10% of each other). As a result, when the map segment 405 is shifted to align the surfaces 415 and 420, the virtual objects are able to stay colinear and evenly spaced.

Conversely, a virtual object that has a strong positional relationship to a physical object (e.g., a virtual hat on a physical statue or a virtual poster on a physical wall) may have its relation vector for the map segment to which it is closest set to approximately one (e.g., exactly or close to one, such as greater than 0.9) and the weight of other relation vectors set to approximately zero (e.g., exactly or close to zero, such as less than 0.1). Thus, the position of the virtual object is closely bound to the map segment that includes the physical object to which it relates, enabling the virtual object to be accurately positioned (e.g., a virtual hat remains on the head of a physical statue rather than floating in the air to one side).

In a further example, a hybrid configuration where objects have general positional relationships to physical objects but also relate somewhat to each other may weight map segments based on proximity to the virtual object (e.g., the closest map segment to the virtual object may be weighted 0.4, the next closest 0.3, etc.). Thus, virtual object positions can be "stretched" by changes in nearby map segments, but remain primarily rooted to a physical location in the nearest map segment.

In some embodiments, to ensure additional accuracy of the alignment between the virtual objects 425 and 435, relation vectors between each virtual object may be generated. There relation vectors may be weighted more highly than the relation vectors between the objects and the map segments so that the vectors between the objects do not change length or direction when map segment shifts occur. For example, the relative position of map segments may be periodically recalculated to account for sensor drift, newly available map data, and other inaccuracies, and the positions of virtual objects updated using the weighted combinations of relation vectors to maintain the desired spatial relationships of virtual objects to each other and the physical environment.

Figure 5:
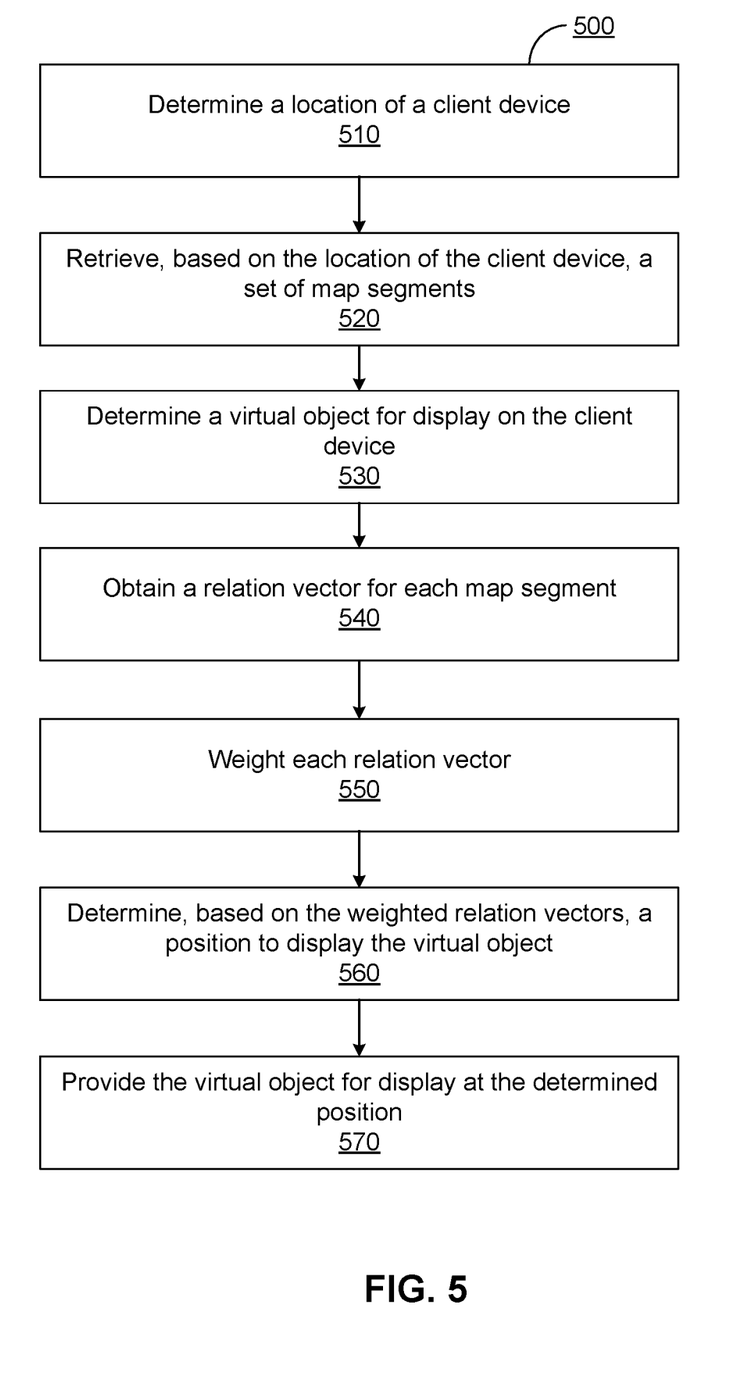
FIG. 5 is a flowchart illustrating a method for aligning map segments according to one or more embodiments.

FIG. 5 is a flowchart illustrating a method 500 for positioning virtual objects according to one or more embodiments. FIG. 5 is not a comprehensive representation of all the steps that may occur in the process of map segment and object alignment. Some of the steps may be performed in different orders, in parallel, or not at all. Furthermore, the method may include the use of other modules and steps before, during, or after the process flow described above. For example, the method 500 may additionally include identifying the virtual object within the map segment and weighting each relation vector based on the identity of the virtual object. In some embodiments, the steps of the method 500 are performed by the mapping module 116 of the game server 110.

The game server 110 determines 510 a real world location of a client device (e.g., client device 120). The location of the client device may be determined by the game server 110 querying the positioning device 128 of the client device 120 via the network 130. In some embodiments, the location of a client device is represented as a GPS coordinate. In another embodiment the location of the client device can be represented as a vector relating the distance and direction between the client device and a known point, such as a landmark.

The game server 110 retrieves 520 a set of map segments based on the location of the client device. The set of map segments may include map segments within a threshold distance of the location of the client device. In some embodiments the game server 110 may set a number of map segments that is retrieves. For example, upon receiving location data from a client device the game server 110 may retrieve the six closest map segments to the location of the client device. Each map segment is a point cloud or mesh that is a three dimensional representation of the real world around the location of the client device.

The game server 110 determines 530 a virtual object to display on the client device. The virtual object may be determined such as by a game event triggered by the user of the client device. In some embodiments, the location of the client device may be associated with a virtual object such that when the location data of the client device indicates the user is near a specific location a virtual object is determined to be displayed.

The game server 110 obtains 540 a relation vector between the virtual object and each map segment of the set of map segments. For example, if six map segments were retrieved by the game server 110, the same server 110 obtains a vector from each map segment to the virtual object. The relation vector indicating a distance and directional relationship between the virtual object and each map segment retrieved.

The game server 110 weights 550 each relation vector based on object parameters of the virtual object. The object parameters of the virtual object indicate factors for position the virtual object. For example, an object parameter may indicate that the virtual object be near another object (virtual or real world) within the same map segment. Therefore, the relation vector between the virtual object and the map segment it is in will have a high weight to ensure the virtual object stays within the current map segment.

The game server 110 determines 560 a position to display the virtual object on a display of the client device based on the weighted relation vectors. To position the object the game server 110 may keep relation vectors with high weights the same length and direction and allow other lower weighted relation vectors to change in length and direction. In some embodiments the relation vectors may be ranked based on their weights in order to determine a position to display the virtual object.

The game server 110 provides 570 the virtual object for display on the client device at the determined position. Instructions indicating the position for the virtual object may be transmitted to the client device via a network. The instructions cause the client device to display the virtual object on the determined position of the client device display.

Example Computing Device Architecture

Figure 6:
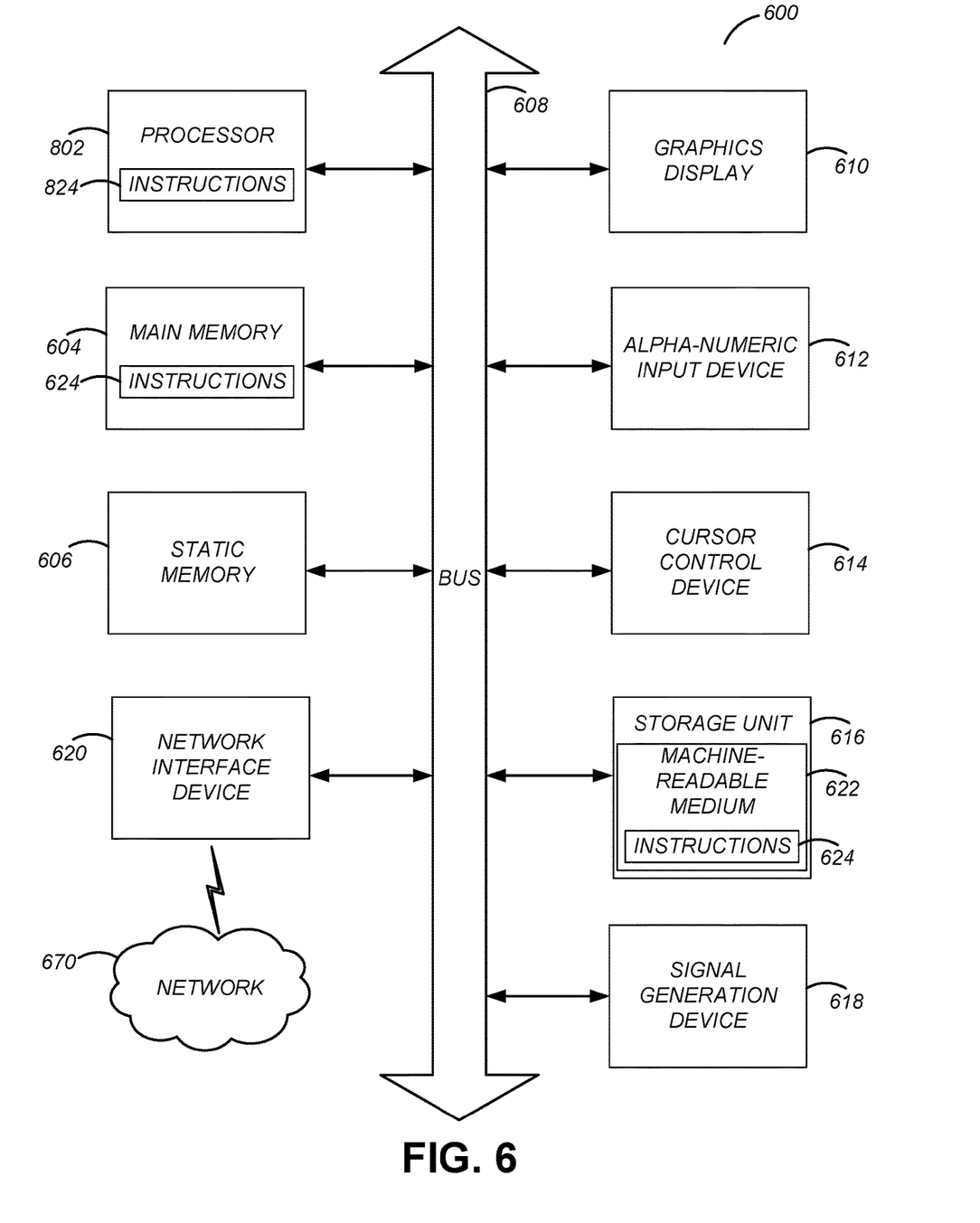
FIG. 6 is a block diagram illustrating an exemplary computer system suitable for use in the computer-based system of FIG. 1, according to one or more embodiments.

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein, including those associated, and described, with the components (or modules) of a game server 110 and/or client 120.

The machine may be a server computer, a client computer, a personal computer (PC), a tablet PC, a set-top box (STB), a smartphone, a network router, switch or bridge, a cell phone tower, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally one or more processors 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 602 may refer to a single processor or multiple processors. The computer system 600 also includes a main memory 604. The computer system may include a storage unit 616. The processor 602, memory 604, and the storage unit 616 communicate via a bus 608.

In addition, the computer system 600 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 670 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

While the present subject matter has been described in detail with respect to specific exemplary embodiments and methods thereof it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for displaying a virtual object comprising:
    determining a location of a client device;
    retrieving, based on the location of the client device, a set of map segments;
    determining a virtual object to display on the client device;
    obtaining a relation vector between the virtual object and each map segment of the set of map segments;
    weighting each relation vector based on object parameters of the virtual object;
    determining a position to display the virtual object based on the weighted relation vectors; and
    providing the virtual object for display on the client device at the determined position.

2. The method of claim 1, wherein the set of retrieved map segments is a set of map segments that represent an area of the real world that is within a threshold distance of the determined location of the client device.

3. The method of claim 1, further comprising obtaining a relation vector between the virtual object to be displayed and a second virtual object, the second virtual object within the retrieved set of map segments.

4. The method of claim 1, wherein determining a virtual object to display is based on the location of the client device.

5. The method of claim 1, wherein determining a virtual object to display is based on a game event.

6. The method of claim 1, wherein, responsive to the object parameters indicating a strong positional relationship between the virtual object and a physical object, a weight of a relation vector for a map segment that includes a representation of the physical object is approximately one and remaining relation vectors are approximately zero.

7. The method of claim 1, wherein, responsive to the object parameters indicating a strong positional relationship between the virtual object and another virtual object, the relation vectors are weighted approximately evenly.

8. The method of claim 1, wherein providing the virtual object for display comprises transmitting instructions to the client device, the instructions comprising a position on a display of the client device corresponding to the determined position of the virtual object.

9. The method of claim 1, wherein each map segment includes a point cloud or mesh.

10. The method of claim 1, further comprising:
    updating relative positions of the map segments; and
    redetermining the position at which to display the virtual object using the updated relative positions of the map segments and the weighted relation vectors.

11. A non-transitory computer-readable storage medium storing instructions for determining a position to display a virtual object that, when executed by a computer system, cause the computer system to perform operations comprising:
    determining a location of a client device;
    retrieving, based on the location of the client device, a set of map segments;
    determining a virtual object to display on the client device;
    obtaining a relation vector between the virtual object and each map segment of the set of map segments;
    weighting each relation vector based on object parameters of the virtual object;
    determining a position to display the virtual object based on the weighted relation vectors; and
    providing the virtual object for display on the client device at the determined position.

12. The non-transitory computer-readable medium of claim 11, wherein the set of retrieved map segments is a set of map segments that represent an area of the real world that is within a threshold distance of the determined location of the client device.

13. The non-transitory computer-readable medium of claim 11, further comprising obtaining a relation vector between the virtual object to be displayed and a second virtual object, the second virtual object within the retrieved set of map segments.

14. The non-transitory computer-readable medium of claim 11, wherein determining a virtual object to display is based on the location of the client device.

15. The non-transitory computer-readable medium of claim 11, wherein determining a virtual object to display is based on a game event.

16. The non-transitory computer-readable medium of claim 11, wherein, responsive to the object parameters indicating a strong positional relationship between the virtual object and a physical object, a weight of relation vector for a map segment that includes a representation of the physical object is approximately one and remaining relation vectors are approximately zero.

17. The non-transitory computer-readable medium of claim 11, wherein, responsive to the object parameters indicating a strong positional relationship between the virtual object and another virtual object, the relation vectors are weighted approximately evenly.

18. The non-transitory computer-readable medium of claim 11, wherein providing the virtual object for display comprises transmitting instructions to the client device, the instructions comprising a position on a display of the client device corresponding to the determined position of the virtual object.

19. The non-transitory computer-readable medium of claim 11, wherein each map segment includes a point cloud or mesh.

20. The non-transitory computer-readable medium of claim 11, wherein the operations further comprise:
   updating relative positions of the map segments; and
   redetermining the position at which to display the virtual object using the updated relative positions of the map segments and the weighted relation vectors.

\* \* \* \* \*